United States Patent [19]

Akao

[11] Patent Number: 4,661,395
[45] Date of Patent: Apr. 28, 1987

[54] PACKAGING MATERIAL FOR PHOTOSENSITIVE MATERIALS FOR PHOTOGRAPHIC PURPOSE

[75] Inventor: Mutsuo Akao, Kanagawa, Japan

[73] Assignee: Fuji Photo Film Co., Ltd., Kanagawa, Japan

[21] Appl. No.: 864,300

[22] Filed: May 16, 1986

[30] Foreign Application Priority Data

May 21, 1985 [JP] Japan ............................ 60-75229[U]

[51] Int. Cl.⁴ ............................................. B32B 5/16
[52] U.S. Cl. ................................... 428/213; 428/458; 428/461; 428/35; 428/334
[58] Field of Search ................. 428/458, 461, 35, 213, 428/334; 430/496

[56] References Cited

U.S. PATENT DOCUMENTS

| | | | |
|---|---|---|---|
| 4,337,285 | 7/1982 | Akao et al. | 428/461 |
| 4,359,499 | 11/1982 | Akao et al. | 428/461 |
| 4,411,945 | 10/1983 | Akao et al. | 428/461 |
| 4,513,050 | 4/1985 | Akao | 428/458 |
| 4,579,781 | 4/1986 | Akao | 428/461 |

*Primary Examiner*—Edith Buffalow
*Attorney, Agent, or Firm*—Burgess, Ryan & Wayne

[57] ABSTRACT

A packaging material for photosensitive materials for photographic purpose comprising
a light-shielding L-LDPE film layer containing a low-pressure linear low-density polyethylene resin as the largest component and 0.1 to 15 wt. % of a light-shielding material and being located as the inner surface layer,
a metal layer provided on the above light-shielding L-LDPE film layer directly or through an adhesive layer, and
a flexible sheet layer laminated on the metal layer directly or through an adhesive layer,
and having delamination resistance between the light-shielding L-LDPE film layer and the metal layer or between the metal layer and the flexible sheet layer in the range of 5 to 300 g/15 mm width.

In the packaging material of the invention, the properties necessary as the packaging material for photosensitive materials such as physical strength, moisture proofing, gas barrier and light-shielding are secured by the light shielding L-LDPE film layer, the metal layer and the flexible sheet layer. By adjusting the delamination resistance of, at least, one side of the metal layer, the physical strength is further raised. The packaging material of the invention is superior in the small difference in tear strength between longitudinal direction and lateral direction, in physical strengths, in heat sealing properties and in light-shielding property. As a result, its thickness can appreciably be made thinner than the conventional packaging material, and its cost is lowered.

6 Claims, 12 Drawing Figures

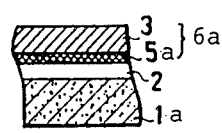
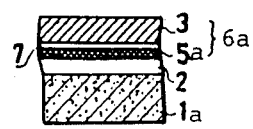
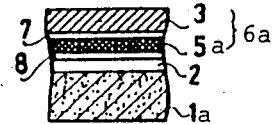
Figure 1   Figure 2   Figure 3
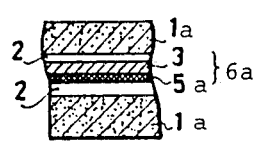
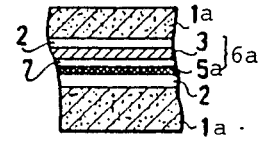
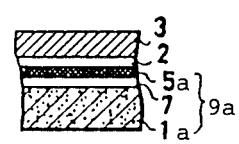
Figure 4   Figure 5   Figure 6
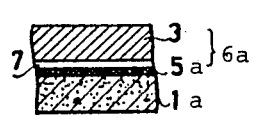
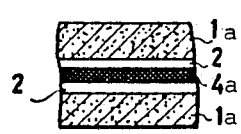
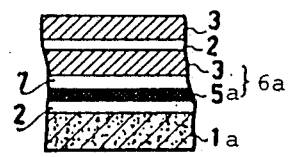
Figure 7   Figure 8   Figure 9

PACKAGING MATERIAL FOR PHOTOSENSITIVE MATERIALS FOR PHOTOGRAPHIC PURPOSE

BACKGROUND OF THE INVENTION

1. Field of the invention

This invention relates to a packaging material for photosensitive materials for photographic purpose.

2. Description of Prior Arts

Various types of packaging materials for photosensitive materials for photographic purpose (hereafter simply referred to as "photosensitive materials") have widely been put to practical use, and various properties are required according to their uses.

As the packaging materials for photosensitive materials, various properties are necessary such as light-shielding, gas barrier, moisture proofing, antistatic property, physical strengths such as breaking strength, tear strength, impact puncture strength, Gelbo test strength and wear resistance, heat sealing properties such as heat seal strength, hot tack properties (hot-seal ability), and seal ability of contraries, bag-making aptitude, delamination resistance, slipping character and the like. Generally, it is difficult to satisfy these properties by a single film layer. Therefore, a single layer film of a high-pressure low-density polyethylene (LDPE) kneaded with carbon black or a pigment, or a composite laminated film composed of a LDPE film containing carbon black or a pigment dispersed therein and a flexible sheet such as paper, aluminum foil or cellophane, etc. has been employed. An example of the conventional laminated film is shown in FIG. 11. This film is composed of a light-shielding LDPE film layer 10a, a light-shielding metal foil layer 4a laminated on it through an adhesive layer 2, and a flexible sheet layer 3 laminated thereupon through an adhesive layer 2. Another example of the conventional film is shown in FIG. 12. This film was used for packaging color photographic printing paper, and it is composed of a light-shielding LDPE film layer 10a, a light-shielding metal foil layer 4a as a metal layer, a flexible sheet layer 3, and a light-shielding LDPE film layer 10a. They are laminated in that order, and an adhesive layer 2 is provided between each layers.

On the other hand, the present inventor has already disclosed a laminated film for photosensitive materials of which physical strength was raised by combining two uniaxially stretched films (U.S. Pat. No. 4,331,725). Another laminated film for photosensitive materials has also been disclosed. This film is composed of a foamed sheet layer and two uniaxially stretched thermoplastic resin film layers having a light-shielding property and laminated on both faces of the foamed sheet layer directly or through an adhesive layer. Thickness of the foamed sheet layer is in the range of 0.3 to 2.0 mm, and expansion ratio is 5 to 50 times. Two uniaxially stretched films are located so that their stretched axes cross each other at an angle of more than 30 degrees, and the laminated film is compressed up to 40 to 85% of theoretical total thickness. Impact puncture strength and Gelbo test strength of the compressed laminated film is large, and curling hardly occurs. This film is suitable for a weight material (U.S. Pat. No. 4,565,733).

However, each packaging material has been utilized only for limited photosensitive materials because of cost and characteristics as a packaging materials. Though the above laminated films were made in order to improve the foregoing physical properties, in the case that metallic membrane layer is introduced in order to secure gas barrier, antistatic property and moisture proofing, physical properties of these conventional films were still not enough. During packaging, the films were sometimes torn or punctured or heat sealing of the films was sometimes separated, particularly in the cases of weight products and roll films having a sharp edge. In addition, when a large amount of a light-shielding material such as carbon black was added, physical strength of the film was lowered. Then, the amount was set about 3%, and total thickness of the film was more than 70 μm. As the result, the film was stiff, and working efficiency of the packaging process was badly influenced. Cost of the packaging was also expensive. In the case of the laminated film shown in FIG. 12, tear strength, impact puncture strength, Gelbo test strength, etc. were not enough. In the case of the laminated film disclosed in the specification of U.S. Pat. No. 4,331,725, since two layers of uniaxially stretched film were necessary, the laminated film was thick and expensive as the packaging material, though physical properties such as tear strength were improved. In the case of the laminated film disclosed in U.S. Pat. No. 4,565,733, the laminated film was thick and its heat sealing properties were not well in order to secure light-shielding and moisture proofing. Furthermore, since bag-making aptitude was also not well, bag for packaging photosensitive materials was formed by using a heat sealer having a special cooling device, and a hot bar was pressed through a heat-resistant film. As a result of these, the laminated film of U.S. Pat. No. 4,565,733 was expensive. Furthermore, in the cases of conventional packaging materials containing a metal foil layer, their physical strength is lowered, and thereby, they were sometimes torn or a pinhole problem encountered.

A packaging film for photosensitive materials which is a laminated film at least containing a metallized film layer and two polyethylene polymer layers which are located both sides of the metallized film layer has also been disclosed by the present inventor (U.S. patent application Ser. No. 769,573). In this packaging film, at least one of the above polyethylene polymer layers contains more than 50 wt. % of linear low density polyethylene manufactured by low pressure method, one side or both of the above polyethylene polymer layers contains 0.3 to 30 wt. % of a light-shielding material, and strength of one side or both of the above polyethylene polymer layers is stronger than adhesive force between the above metallized film and difference in the thickness of the polyethylene polymer layers is smaller than 50%.

This film is superior various physical strength, moisture proofing, gas barrier, light-shielding and antistatic character.

SUMMARY OF THE INVENTION

It is an object of the invention to provide a packaging material for photosensitive materials which is superior in physical properties and heat sealing properties.

It is another object of the invention to provide a packaging material for photosensitive materials of which layer separation does not occur.

It is still another object of the invention to provide a packaging material for photosensitive materials which is made thin.

It is a further object of the invention to provide a packaging material for photosensitive materials which is inexpensive.

It is a still further object of the invention to provide a packaging material for photosensitive materials which is suitable for a weight photosensitive material and a roll film having a sharp edge.

The present invention provides a light-shielding packaging material for photosensitive materials for photographic purpose, which is characterized by a laminate of a low-pressure linear low-density polyethylene (L-LDPE) resin film layer containing a light-shielding material as the inner surface layer, a metal layer and a flexible sheet layer laminated in this order, and delamination resistance between the L-LDPE film layer and the metal layer or between the metal layer and the flexible sheet layer adjusted to a particular range.

BRIEF DESCRIPTION OF THE DRAWINGS

FIGS. 1 to 9 are sectional views of preferred embodiments of the invention.

Figure 10:

The packaging material of FIG. 1 is the most fundamental packaging material consisting of a light-shielding L-LDPE film layer 1a containing a light-shielding material and a metallized flexible sheet layer 6a consisting of a flexible sheet layer 3 and a metallic membrane layer 5a as a metal layer laminated thereon through an adhesive layer 2.

The constitution of the packaging material of FIG. 2 is the same as that of FIG. 1, except that an anchor coat layer 7 is provided on the flexible sheet layer 3 and the metallic membrane layer 5a is formed thereon.

The packaging material of FIG. 3 is the same as that of FIG. 2, except that a overcoat protection layer 8 is provided on the metallic membrane layer 5a of the metallized flexible sheet layer 6a.

The packaging material of FIG. 4 consists of the laminated film of FIG. 1 and light-shielding L-LDPE film layer 1a laminated on the flexible sheet layer 3 of the laminated film through an adhesive layer 2.

The packaging material of FIG. 5 consists of the laminated film of FIG. 2 and a light-shielding L-LDPE film layer 1a laminated on the flexible sheet layer 3 of the laminated film through an adhesive layer 2.

The packaging material of FIG. 6 consists of a light-shielding matallized L-LDPE film layer 9a consisting of a light-shielding L-LDPE film layer 1a on which an anchor coat layer 7 is coated and then a metallic membrane layer 5a is formed thereon, and a flexible sheet layer 3 laminated thereon through an adhesive layer 2.

The packaging material of FIG. 7 consists of a metallized flexible sheet layer 6a consisting of a flexible sheet layer 3 on which an anchor coat layer 7 is coated and then a metallic membrane layer 5a is formed thereon, and a light-shielding L-LDPE film layer 1a directly laminated thereon by extrusion laminating.

The packaging material of FIG. 8 consists of a metal foil layer 4a as a metal layer and two light-shielding L-LDPE film layers 1a, 1a laminated on both faces of the metal foil layer 4a each through an adhesive layer 2.

The packaging material of FIG. 9 consists of the laminated film of FIG. 2 and a flexible sheet layer 3 laminated on the flexible sheet layer 3 of the laminated film.

Figure 11:
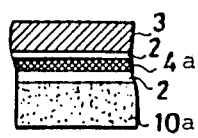
Figure 12:
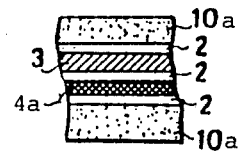

FIGS. 10 to 12 are sectional views of conventional packaging materials.

The conventional packaging material of FIG. 10 is a single layer film of a light-shielding LDPE film layer 10a.

The conventional packaging material of FIG. 11 consists of a light-shielding LDPE film layer 10a, a metal foil layer 4a laminated thereon through an adhesive layer 2, and a flexible sheet layer 3 further laminated thereon through an adhesive layer 2.

The conventional packaging material of FIG. 12 consists of a light-shielding LDPE film layer 10a, a metal foil layer 4a laminated thereon through an adhesive layer 2, a flexible sheet layer 3 laminated thereon through an adhesive layer 2, and a light-shielding LDPE film layer 10a laminated thereon through an adhesive layer 2. This laminated film was used as the packaging material for a roll of photographic color printing paper.

DETAILED DESCRIPTION OF THE INVENTION

The light-shielding L-LDPE film layer contains L-LDPE resin as the largest component.

L-LDPE is a copolymer of ethylene and $\alpha$-olefin, and it has a linear structure having short branches. Carbon number of the $\alpha$-olefin is 3–13, preferably 4–10, more preferably 6–8, and examples are butene-1, 4-methylpentene-1, hexene-1 and octene-1. Preferable $\alpha$-olefins are 4-methylpentene-1, hexene-1 and octene-1. Suitable ethylene content of L-LDPE is 85–99.5 mol. %, i.e. $\alpha$-olefin content is 0.5–15 mol. %, and preferable ethylene content is 90–99.5 mol. %, i.e. $\alpha$-olefin content is 0.5–10 mol. %. Density is usually in the range of 0.87–0.95 g/cm$^3$, preferably 0.91–0.94 g/cm$^3$, and melt index (M.I.) is preferably 0.4–30 g/10 minutes. (JIS K 6760). Such a L-LDPE is manufactured by low pressure method. Examples of L-LDPE are "DOWLEX" (trade name, Dow Chemical Co., Ltd.), "STAMILEX" (trade name, DSM) and "ULTZEX" (trade name, Mitsui Petroleum Chemical Industries Co., Ltd.).

Content of L-LDPE resin in this film layer is more than 40 wt. %, preferably more than 50 wt. %, further preferably more than 60 wt. %. The L-LDPE resin is superior in strength, but it is inferior in the difficulty of processing. By blending other resins, the problem of processing is improved, and furthermore, tear strength, heat seal strength and Gelbo test strength are remarkably raised. The upper limit of the content is 99.5 wt. % or less, and it is different according to the kind of the resin, etc.

As the resin to be blended with L-LDPE, LDPE is preferably employed. Other polyethylene polymers, such as ethylene-vinyl acetate copolymer (EVA), ethylene-ethyl acrylate copolymer (EEA), ethylene-methacrylate copolymer (EMA), polyisobutylene and ethylene-acrylic acid copolymer (EAA), polypropylene resins, etc. can be added to the extent so far as its fundamental characteristics are not changed.

The film layer consisting of four components, i. e. 40 wt. % of L-LDPE resin, 6 wt. % of carbon black, 39 wt. % of LDPE resin and 15 wt. % of EAA resin is usable as the light-shielding L-LDPE film layer of the invention. This is an example of the film layer having the lowest L-LDPE resin content.

The light-shielding material includes every material capable of shielding visible and ultraviolet lights.

Examples of the light-shielding material are various carbon blacks, an iron oxide, zinc white, a titanium oxide, clay, aluminum powder, aluminum paste, calcium carbonate, mica, barium sulfate, talc, cadmium pigments, chrome yellow, red iron oxide, cobalt blue, copperphthalocyanine pigments, monoazo and polyazo pigments, aniline black and various metal fibers. Various carbon blacks, aluminum powder and aluminum paste from which volatile components are removed are preferable.

The form of the light-shielding material prior to blending may be powder, paste, wet state, masterbatch, pellets, etc.

Carbon blacks are divided into gas black, oil furnace black, anthracene black, acetylene black, lamp black, vegetable black and animal black according to their origin. Among these, oil furnace carbon black is preferable in terms of light-shielding character, cost and improvement of properties. On the other hand, since acetylene black and Ketschen carbon black have antistatic character, they are also preferable, though they are expensive. They may be blended to the oil furnace black in order to improve its character. Suitable pH of carbon black is at 5 to 9, particularly at 6 to 8, and suitable mean particle size is 10 to 50 mµ. Particularly, the oil furnace carbon black or the acetylene black having pH 6 to 9 and mean particle size of 15 to 30 mµ are preferable. By using the carbon black of such pH and particle size, a packaging material having the following merits is obtained. That is, the occurrence of fogging is rare, increase or decrease of photosensitivity scarcely happens, light-shielding ability is large, and the lumps of carbon black and pinholes such as fish eye hardly generate.

L-LDPE resin film is superior to LDPE resin film in strength, but it is inferior in the difficulty of processing, the occurrence of blocking between films and its poor slipping character. Accordingly, it was considered that this film was not suitable for packaging. However, the present inventor has examined the influence of carbon black upon L-LDPE resin, and he has found that physical strength of the L-LDPE resin largely increases by blending carbon black contrary to the case of LDPE resin. That is, strength of LDPE resin is essentially weaker than L-LDPE resin, and it is remarkably lowered by adding carbon black.

The effect of carbon black clearly appears at 1 wt. %, and remarkably appears at more than 3 wt. %. While, lumps increase with increasing the amount of carbon black. When its content exceeds 30 wt. %, the lumps remarkably increases and pinholes also forms. On the other hand, carbon black is effective as light-shielding. In this case, light-shielding effect appears at 0.3 wt. %, clearly appears at 1 wt. %, and remarkably appears at more than 3 wt. %. As the packaging material for photosensitive materials, moistureproofness, flatness, strength of film surface, heat seal ability and contamination of a photosensitive article or material are also problems. Accordingly, when these problems are also taken into consideration, suitable content of carbon black is in the range of 0.1 to 15 wt. %, and the range of 3 to 7 wt. % is particularly preferable.

Carbon black is blended to the L-LDPE film layer to touch a photosensitive article or material to be packaged. By this location, the carbon black effectively shields light, it prevents the occurrence of blocking, it gives a slipping character, and it exhibits antistatic properties.

When other light-shielding material is employed, suitable content is 0.1 to 15 wt. %. In the case of stretched, suitable content is 0.1 to 7 wt. % and when the content is beyond 12 wt. %, fish eye problem and lowering of physical strength happen. While, in the case of unstretched, the content may be up to 15 wt. %.

As the method of blending a light-shielding material, the masterbatch method is preferable in points of cost and clear process. Various masterbatch methods are known, and any known method may be employed. Such a masterbatch method includes the method of dispersing carbon black into a polymer organic solvent solution to produce a masterbatch (Japanese Patent KOKOKU No. 40-26196) and the method of dispersing carbon black into polyethylene to produce a masterbatch (Japanese Patent KOKOKU No. 43-10362).

In this method, first, a masterbatch of LDPE is prepared by blending more than 2%, usually more than 10%, of carbon black with LDPE. Then, L-LDPE is mixed with this masterbatch so that carbon black content becomes a prescribed value. Instead of LDPE, other polyolefin resins such as EEA and EVA or other thermoplastic resins capable of mixing wirh L-LDPE may also be employed. In this masterbatch method, mixing and dispersing of carbon black is easier than the case of blending carbon black directly with L-LDPE. As a result, fish eye problem is improved and manufacturing cost is lowered. In addition, though the L-LPDE film layer produced by this method always contain LDPE, processing character of the mixed polymer of L-LPDE and LDPE is superior to that of L-LDPE alone. The resin for masterbatch is not limited to LDPE. As this resin, a polyolefin resin of which MI is higher than L-LDPE is preferable because of homegeneous blending. L-LDPE may also be employed as the resin for masterbatch in order to save cost.

The compound coloring method where carbon black is homogenously mixed in the final concentration at the beginnning may also be utilized. Other light-shielding materials may be blended similarly.

The light-shielding L-LDPE film is molded, for example, by T die extrusion or inflation process. Melt tension and fluidity of L-LDPE resin are large problems in molding, and the energy necessary to produce film is larger than that of a conventional polyethylene. Modification or exchange of inflation molding machine is sometimes required. For that purpose, a modification of screw structure has been proposed (Japanese Patent KOKAI No. 55-117638). However, according to the masterbatch method described later, such modification is not necessary in the case of containing carbon black and more than 5% of LDPE resin, EEA resin, EVA resin, etc., and T die and inflation molding machine can be used as it is. In the inflation process, the L-LDPE film of which the difference between longitudinal direction (MD) strength and lateral derction (TD) strength is small can be produced by raising the melting temperature of L-LDPE resin or by adjusting the blow-up ratio to 1.2 to 2.4.

The light-shielding L-LDPE film may be molded as a coextruded film. In this case, the light-shielding L-LDPE film layer is located at the inner face layer to contact with a photosensitive article or material.

Thickness of the light-shielding L-LDPE film is thicker than 20 µm and preferably in the range of 35 to 120 µm.

A preferable film layer comprises more than 50 wt. % of L-LDPE resin, 1 to 7 wt. % of oil furnace carbon black of pH 6 to 8 and 0.05 to 0.5 wt. % of a fatty acid amide lubricant, and its thickness is in the range of 40 to 100 µm.

A metal layer is provided on the light-shielding L-LDPE film layer. The metal layer is a metal foil layer or a metallic membrane layer.

The metal foil includes aluminum foil, tin foil, lead foil, thin steel film coated with zinc and thin metal film formed by electrolysis, having a thickness of 5 to 50 μm preferably 5 to 20 μm.

A flexible sheet layer is further laminated on the metallic membrane film (metallized film) layer, and the metallic membrane layer may be formed on either of the light-shielding L-LDPE film layer or the flexible sheet layer.

Subsequently, a metallized flexible sheet which is particularly suitable for the packaging material of the invention is explained.

Metallization is carried out according to a known method, such as vacuum evaporation, sputtering, ion plating, or electron beam heating. The metallic membrane layer may be formed one face or both faces of the flexible sheet layer.

The metallic membrane layer may be formed of a pure metal such as Al, Sn, Zn, Co, Cr, Ni, Fe, Cu, etc., alloys thereof, or any other metals of which metallic membrane layer can be made, but aluminum is the most preferable in terms of processing and cost.

Thickness of metallic membrane layer to be metallized is 55-1200Å. When the thickness is thinner than 55Å, antistatic property of the film is insufficient. Moreover, in order to secure moistureproof and light-shielding, thickness of other layers such as the polyethylene polymer layer, a heat-resistant sheet layer and a heat sealing layer (the heat sealing layer endowed with light-shielding is preferable.) must be increased. On the other hand, when the thickness is thicker than 1200Å, degradation of the flexible sheet occurs by the heat of metallizing, and strength of the laminated film to be produced falls. In the case of aluminum-metallized membrane, preferable thickness is thicker than 70 Å, more preferably 80 to 800 Å, further more preferably 100 to 600 Å.

The flexible sheet is thin (5 to 70 μm in thickness), and it is superior in physical strength, moistureproofing, gas barrier, and antistatic property. The flexible sheet suitable for the invention includes various papers, synthetic papers, cellophane and thermoplastic resin films, having a thickness of 8 to 40 μm, and polypropylene films, polyester films, polyethylene films and nylon films, having a thickness of 8 to 30 μm and being uniaxially or biaxially oriented are preferable. Unstretched polypropylene films having a thickness of 10 to 40 μm are also preferable because of large physical strength and inexpensiveness. Extremely thin fortified films having a thickness of 8 to 30 μm made of a high-density polyethylene of which the blow-up ratio is large (2 to 10) is particularly preferable because of large physical strength and inexpensiveness. The flexible sheet may be a stretched or unstretched L-LDPE film layer or the stretched or unstretched light-shielding L-LDPE film layer described previously.

Delamination resistance between the light-shielding L-LDPE film layer and the metal layer or between the metal layer and the flexible sheet layer is adjusted to 5 to 300 g/15 mm width. The inventor has found that since both of the above delamination resistance of the conventional packaging materials is too large, the physical strength of the packaging materials is lowered to the contrary. Thereby, the packaging materials were sometimes torn or a pinhole problem happened. The adjustment of delamination resistance in the range of 5 to 300 g/15 mm width is necessary in order to secure tear strength, impact puncture strength, dropping strength and Gelbo test strength. When the delamination strength is less than 5 g/15 mm width, layer separation (delamination) occurs. On the other hand, when the delamination resistance is larger than 300 g/15 mm width, the physical strength is lowered. It is sufficient that the delamination resistance of one side of the metal layer is adjusted to the above range, and however, the delamination resistance of both sides may be adjusted.

The delamination resistance can be adjusted by activation of the surface of the light-shielding L-LDPE film layer or the flexible sheet layer to be metallized, by providing an under coat layer (anchor coat layer), etc.

Representative methods to adjust delamination resistance are described below.

(A) Activation of surface of flexible sheet and thereafter metallization
 (1) Activation by corona discharge
 (2) Activation by ultraviolet irradiation
 (3) Activation by flame treatment
 (4) Activation by dichromate treatment
 (5) Activation by an oxidizing agent such as mixed acid (B) Coating of substance having affinity for metal on the surface activated by one of the method of (1) (Application of anchor coat) and thereafter metallization
 (1) Coating of polyester resin solution
 (2) Coating of polyamide resin solution
 (3) Coating of polyurethane resin solution
 (4) Coating of epoxy resin solution
 (5) Coating of cellulose derivative resin solution
 (6) Coating of polyvinyl acetate resin solution
 (7) Coating of polyvinyl butyral resin solution
 (8) Coating of EAA, EEA or EMA (C) Undercoating of one of the resin of (2) such as epoxy resin before metallization and overcoating of one of the protection resin described later such as butyral resin after metallization (D) Short heat treatment of flexible sheet layer near the melting point before or after matallization (E) Addition of substance having affinity for metal to flexible sheet layer A protection layer may be provided on the metallic membrane layer in order not only to protect the metallic membrane layer but also to adjust delamination resistance of the light-shielding L-LDPE film laminated on the metallized flexible sheet layer through an adhesive layer. As the resin for the protection layer, butyral resin, acrylic resin, cellulose resins such as cellulose acetate resin, urethane resin, epoxy resin, polyester resin, ionomer resin, EEA resin, various polyethylene resins and various polypropylene resins are usable. Wax, gelatin and polyvinyl alcohol are also usable. Thickness of the protection layer is made extremely thin such as thinner than 50 μm, preferably thinner than 5 μm, in order to eliminate static electricity effectively. Such a protection layer may be formed by a known solution coating or spray coating. A conductive meterial such as an antistatic agent, carbon black, a metal powder such as aluminum powder or aluminum paste or carbon fiber may be added to a flexible sheet, a light-shielding layer, an adhesive layer or the protection layer, and thereby, elimination of static electricity is made sure.

An adhesive layer may be provided between the light-shielding L-LDPE film layer and the metal layer or between the metal layer and the flexible sheet layer. The adhesive is able to adhere to both layers to be joined, and selected from a thermoplastic resin melting adhesives including a polyolefin adhesives, a hot melting type gum adhesives and a solution type adhesives. The polyolefin adhesives include a homopolymer and a copolymer of an olefin such as various polyethylenes, polypropylenes, polybutenes and ethylene-propylene copolymers and L-LDPE, a copolymer of an olefin and another monomer such as ethylene-vinyl acetate copolymer, ethylene-ethyl acrylate copolymer, ethylene-acrylic acid copolymer, various ionomers ("SURLYN" Dupont, "Himiran" Mitsui Polychemicals Co., Ltd., etc.) and a graft copolymer. The solution type adhesives are divided into adhesives for wet lamination and adhesives for dry lamintion. The adhesives for wet lamination are emulsion or latex. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acetate-maleate ester copolymer, the emulsion of acrylic copolymer and the emulsion of ethyleneacrylic acid copolymer. Examples of the latex-type adhesives are natural rubber latex, styrene-butadiene rubber latex, acrylonitrile-butadiene rubber latex and chloroprene rubber latex. An example of the adhesives for dry lamination is polyurethane adhesive. Adhesives for hot melt lamination where paraffin wax, microcrystalline wax, ethylene-vinyl acetate copolymer, ethylene-ethylacrylate copolymer and etc. are blended, pressure-sensitive adhesives and temperature-sensitive adhesives may also be employed. Meting point of the adhesive employed is preferably lower than 5° C. from the melting point of the light-shielding L-LDPE film or the flexible sheet to be coated in order to laminate without bad influence upon the layer to be coated by a thermal melting adhesion.

The delamination resistance mentioned previously may also be adjusted by controling the thickness of the adhesive layer. Thickness of the adhesive layer formed by extrusion laminating using a thermoplastic resin is usually 7 to 30 μm, preferably 10 to 15 μm.

Lamination may be carried out according to an usual method such as a heat sealing (hot bar sealing, impulse heat sealing, supersonic welding, etc.), the method using an adhesive (wet laminating, dry laminating, hot melt laminating, extrusion laminating, etc.) and co-extrusion method.

Other flexible sheet layer(s) may further be added to the laminated film of the invention. As such a flexible sheet layer, various thermoplastic resin films such as various polyethylene films, ethylene copolymer films, polypropylene films, polyvinyl chloride films, polyvinylidene chloride films, polyamide films, polycarbonate films, fluorocarbon polymer films, polyester films and their modified resin films. Various known flexible sheets such as cellulose acetate film, cellophane, polyvinyl alcohol film, paper, nonwoven fabric, cross laminated airly fabric, a porous film such as foamed polyethylene sheet, foamed polystyrene sheet and foamed polyurethane sheet are also suitable. The additional flexible sheet layer may be single, or two or more flexible sheet layers may be combined.

As the outer surface layer, a heat-resistant flexible sheet such as bleached kraft paper, synthetic paper, nonwoven fabric and cellophane is suitable for the packaging material to seal such as moistureproof bag because of printability, large physical strength and without melting. Uniaxially or biaxially oriented polyester, nylon, polypropylene and polyethylene films are also preferable because of little contamination of impurities and heat resistance.

Various additives may be added to one or more of the above layers. Examples of the additives are described below.
(1) Plasticizer; phthalic acid esters, glycol esters, fatty acid esters, phosphosic acid esters, etc.
(2) Stabilizer; lead compounds, cadmium compounds, zinc compounds, alkaline earth metal compounds, organic tin compounds, etc.
(3) Antistatic agent; cation surfactants, anion surfactants, nonion surfactants, ampholytic surfactants, etc.
(4) Flame retardant; phosphoric acid esters, phosphoric acid ester halides, halides, inorganic materials, polyols containing phosphor, etc.
(5) Filler; alumina, kaolin, clay, calcium carbonate, mica, talc, titanium oxide, silica, etc.
(6) Reinforcing agent; glass lobing, metallic fiber, glass fiber, glass milled fiber, carbon fiber, etc.
(7) Coloring agent; inorganic pigments (Al, $Fe_2O_3$, $TiO_2$, ZnO, CdS etc.), organic pigments (carbon black, etc.), dyes, etc.
(8) Blowing agent; inorganic blowing agents (ammonium carbonate, sodium hydrogen carbonate), organic blowing agents (nitroso compounds, azo compounds) etc.
(9) Vulcanizing agent; vulcanization accelerator, acceleration assistant, etc.
(10) Deterioration preventing agent; ultraviolet absorber, antioxidant, metal deactivator, peroxide decomposing agent, etc.
(11) Lubricant; paraffin wax, fatty acids, fatty acid amides, esters, higher alcohols, etc.
(12) Coupling agent; silance compounds, titanium compounds, chromium compounds, aluminum compounds etc.
(13) Various thermoplastic resins, rubbers The packaging material of the invention is suitable for packaging silver halide photographic materials for photographic purpose, diazo photographic materials, photosensitive resins, self-developing type photographic materials, diffusion-transfer type photographic materials and other photographic materials which is degraded by moisture, a gas or friction. The packaging material of the invention is also suitable for a weight photosensitive material and a roll having a sharp edge.

Package form may be usual, and includes a single-sheet flat bag, a double-sheets flat bag, a self-standing bag, a single-sheet gusset bag, a double-sheets gusset bag, a film sheet, inner lining for a moisture proof box and a leader paper. The sealing form may also be usual, and includes heat sealing, impulse heat sealing, supersonic welding and high frequency sealing. The methods of using an adhesive and a pressure sensitive adhesive may also be utilized.

In the packaging material of the invention, the properties necessary as the packaging material for photosensitive materials such as physical strength, moisture proofing, gas barrier and light-shielding are secured by the light-shielding L-LDPE film layer, the metal layer and the flexible sheet layer. By adjusting the delamination resistance of, at least, one side of the metal layer, the physical strength is further raised. The packaging material of the invention is superior in the small difference in tear strength between longitudinal direction and lateral direction, in physical strengths, in heat sealing properties and in light-shielding property. As a result, its thickness can appreciably be made thinner than the conventional packaging material, and its cost is lowered.

EXAMPLES

The packaging material of Example 1 corresponds to the embodiment illustrated in FIG. 4. The light-shielding L-LDPE film layer 1a consists of L-LDPE resin ("ULTZEX #2021L", Mitsui Petrochemical Industries Co., Ltd.) containing 3 weight % of oil furnace carbon black of pH 7.7, 7.5 weight % of LDPE resin and an oleic acid amide lubricant and it was formed by inflation process. The blow-up ratio is 1.3, and the thickness of the film is 50 μm. The surface of the flexible sheet layer 3 consisting of 15 μm in thickness of biaxially stretched nylon film was treated by corona discharge, and thereafter, 400 Å in thickness of aluminum membrane was formed thereon by vacuum metallizing to produce a metallized flexible sheet layer 6a. Two light-shielding L-LDPE film layers 1a, 1a mentioned above were laminated on both sides of the metallized flexible sheet layer 6a each through 13 μm in thickness of LDPE adhesive layer 2.

The packaging material of Example 2 also corresponds to the embodiment of FIG. 4. This packaging material is the same as Example 1, except that 25 μm in thickness of unstretched polypropylene film was employed as the flexible sheet layer 3 instead of biaxially stretched nylon film.

The packaging material of Example 3 corresponds to the embodiment of FIG. 5. This packaging material is the same as Example 1, except that an anchor coat layer 7 was provided on the activated surface of the biaxially stretched nylon film 3, and thereafter, the aluminum metallization was carried out.

The packaging material of Example 4 corresponds to the embodiment of FIG. 8. Two light-shielding L-LDPE film layers 1a, 1a which are the same as employed in Example 1 were laminated on both faces of 7 μm in thickness of aluminum foil layer 4a each through 13 μm in thickness of LDPE adhesive layer.

Comparative packaging material 1 corresponds to FIG. 5. This packaging material is the same as Example 3, except that the face of the aluminum membrane layer 5a and the reverse face of the biaxially stretched nylon film 3 were activated, and accordingly, this packaging material has the delamination resistance nearly equal to the conventional packaging materials.

Conventional packaging material 1 corresponds to FIG. 11. This packaging material consists of 70 μm in thickness of the light-shielding LDPE film layer 10a containing 3 wt. % of carbon black, 7 μm in thickness of aluminum foil layer 4a laminated thereon through an adhesive layer 2, and 35 g/m² of blenched kraft paper as the flexible sheet layer 3 further laminated thereon through an adhesive layer 2.

Conventional packaging material 2 corresponds to FIG. 12. In this packaging material, the light-shielding LDPE film layer 10a containing 3 wt. % of carbon black and polyisobutylene was further laminated on the flexible sheet layer 3 of the above conventional packaging material 1 through an adhesive layer 2. This packaging material was used for packaging a roll of color photographic printing paper. Constitutions of the above packaging materials are tabulated in Table 1, and their properties are tabulated in Table 2.

In the packaging materials, the following materials are employed;

Biaxially stretched nylon film layer 3: Biaxially stretched nylon 6 film (Unitika Ltd.)
LDPE layer 10a: "DFD-0111" (Nippon Unicar Co., Ltd.)
  MI: 2.4 g/10 minutes,
  Density: 0.923 g/cm³
LDPE adhesive layer 2: "MIRASON 14" (Mitsui Polychemicals Co., Ltd.)
  MI: 5.1 g/10 minutes,
  Density: 0.919 g/cm³
Carbon black: "#44B Oil furnace carbon black" (Mitsubishi Chemical Industries Ltd.)
  Mean particle size: 21 μm,
  pH: 7.7

TABLE 1

|  | Invention | | | | Comparative | Conventional | |
|---|---|---|---|---|---|---|---|
|  | 1 | 2 | 3 | 4 | 1 | 1 | 2 |
| Light-Shielding L-LDPE (LDPE) Film Layer | | | | | | | |
| L-LDPE wt. % | 89.5 | 89.5 | 89.5 | 89.5 | 89.5 | 0 | 0 |
| LDPE wt. % | 7.5 | 7.5 | 7.5 | 7.5 | 7.5 | 97 | 97 |
| Carbon Black wt. % | 3 | 3 | 3 | 3 | 3 | 3 | 3 |
| Thickness μm | 50 | 50 | 50 | 50 | 50 | 70 | 50 |
| Flexible Sheet Layer | | | | | | | |
| Kind | Stretched Nylon | Unstretched Polypropylene | Stretched Nylon | (L-LDPE) | Stretched Nylon | Bleached Kraft Paper | Bleached Kraft Paper |
| Thickness μm | 15 | 25 | 15 | (50) | 15 | 35 g/m² | 35 g/m² |
| Metal Layer | | | | | | | |
| Kind | Al Membrane | Al Membrane | Al Membrane | Al Foil | Al Membrane | Al Foil | Al Foil |
| Thickness Å | 400 | 400 | 400 | 7 μm | 400 | 7 μm | 7 μm |
| Activation | | | | | | | |
| X*1 | CD*4 | CD | CD AC*5 | — | CD AC | — | — |
| Y*2 | — | — | — | — | AC | CD | CD |
| Z*3 | — | — | — | — | CD | — | — |
| Adhesive Layer | | | | | | | |
| Kind | LDPE | LDPE | LDPE | LDPE | LDPE | LDPE | LDPE |
| Thickness μm | 13 | 13 | 13 | 13 | 15 | 15 | 15 |
| Total Thickness μm | 150 | 161 | 153 | 135 | 154 | 158 | 195 |

TABLE 1-continued

|  | Invention | | | | Comparative | Conventional | |
|---|---|---|---|---|---|---|---|
|  | 1 | 2 | 3 | 4 | 1 | 1 | 2 |
| FIG. No. | 4 | 4 | 5 | 8 | 5 | 11 | 12 |

*¹X: Surface activation of flexible sheet layer to be metallized
*²Y: Surface activation of metal membrane layer on which an adhesive is coated
*³Z: Surface activation of flexible sheet layer on which an adhesive is coated
*⁴CD: Corona discharge
*⁵AC: Anchor coat

TABLE 2

|  |  | Invention | | | | Comparative | Conventional | |
|---|---|---|---|---|---|---|---|---|
|  |  | 1 | 2 | 3 | 4 | 1 | 1 | 2 |
| The Lowest Delamination Resistance | g/15 mm | FS*¹-AM*² 8 | FS-AM 23 | AM-AD*³ 173 | AF*⁴-AD 286 | FS-AM 325 | AF-AD 432 | AF-AD 368 |
| Tear Strength |  |  |  |  |  |  |  |  |
| MD | g | 651 | 1206 | 563 | 995 | 263 | 212 | 294 |
| TD | g | 808 | 1600< | 768 | 1600< | 312 | 157 | 610 |
| Impact Puncture Strength | Kg·cm | 23.8 | 28.6 | 21.3 | 21.2 | 16.3 | 4.6 | 5.1 |
| Light-Shielding Ability | — | A | A | A | A | A | B | A |
| Gelbo Test Strength | — | A | A | B | B | C | C | B |
| Hot-Tack Property | — | A | A | A | A | A | D | D |
| Moisture proofing | g/m²·24 hr | 1> B | 1> B | 1> B | 0.5> A | 1> B | 0.5> A | 0.5> A |

*¹Flexible sheet
*²Aluminum membrane
*³Adhesive
*⁴Aluminum foil

Evaluations in Table 2 are carried out as follows;
A very excellent
B excellent
C practical
D having a problem
E impractical Testing methods were as follows;
Density; JIS K 6760 (=ASTM D-1505)
Melt Index; JIS D 6760 (=ASTM 1238)
Thickness; JIS P 8118
Tear Strength; JIS P 8116
Impact Puncture Strength; JIS P 8134
Gelbo Test Strength; Estimated by the number of bendings until the sample lost its light-shielding property due to the occurrence of pin holes. The testing machine according to U.S. Military Standard MIL-B 131 was employed. The larger number expresses the larger strength.
A 101 times or more
B 51-100 times
C 7-50 times
D 3-7 times
E 2 times or less Light-Shielding Character; A photographic film of ASA 100 was put into the bag made by each exemplified film, and then the bag was completely sealed. This bag was exposed to the light of 80,000 luxes for one hour, and the light-shielding character was estimated by the fogging degree of the photographic film.

Hot Tack Properties (Hot-Seal Ability); Two sheets of each exemplified film having 15 mm in width was sealed by heat sealing, and just after, the open ends were pulled by the weight of 45 g at the releasing angle of 22.5 degrees. This character was estimated by the released length (cm).

Moistureproofness; JIS Z 0208-1976
Delamination Resistance; Each exemplified film having 15 mm in width was partially delaminated at the position to be delaminated most easily, and one delaminated terminal was fixed by a clip. Load was added to the other delaminated terminal by using a weight, and the delamination resistance was the weight to begin delamination.

I claim:

1. A packaging material for photosensitive materials for photographic purpose comprising
a light-shielding L-LDPE film layer containing a low-pressure linear low-density polyethylene resin as the largest component and 0.1 to 15 wt. % of a light-shielding material and being located as the inner surface layer,
a metal layer provided on said light-shielding L-LDPE film layer directly or through an adhesive layer, and
a flexible sheet layer laminated on said metal layer directly or through an adhesive layer,
and having delamination resistance between said light-shielding L-LDPE film layer and said metal layer or between said metal layer and said flexible sheet layer in the range of 5 to 300 g/15 mm width.

2. The packaging material of claim 1, wherein said metal layer is 55 to 1200 Å in thickness of aluminum membrane layer formed by metallization.

3. The packaging material of claim 1, wherein said metal layer is 5 to 20 μm in thickness of aluminum foil.

4. The packaging material of claim 1, wherein said flexible sheet layer is a member selected from the group consisting of uniaxially or bioxially stretched, polypropylene films, polyester films, polyethylene films and nylon films, and unstretched polypropylene films.

5. The packaging material of claim 4, wherein said flexible sheet layer is the same film as the light-shielding L-LDPE film layer.

6. The packaging material of claim 1, wherein said light-shielding material is oil furnace carbon black having pH 6 to 9 and mean particle size of 15 to 30 μm.

* * * * *